United States Patent
Quine (10) Patent No.: US 8,504,828 B2
(45) Date of Patent: Aug. 6, 2013

(54) SURFACE PROFILE TRACING OF A DOCUMENT

(75) Inventor: Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 2601 days.

(21) Appl. No.: 11/236,920

(22) Filed: Sep. 28, 2005

(65) Prior Publication Data

US 2007/0074030 A1    Mar. 29, 2007

(51) Int. Cl.
*G06F 21/00* (2006.01)

(52) U.S. Cl.
USPC .................................... 713/168; 713/180

(58) Field of Classification Search
USPC ............... 902/7; 713/176, 180, 168; 382/135, 382/137
See application file for complete search history.

(56) References Cited

U.S. PATENT DOCUMENTS

| | | | | |
|---|---|---|---|---|
| 6,473,519 | B1* | 10/2002 | Pidhirny et al. | 382/140 |
| 2005/0252960 | A1* | 11/2005 | Murata | 235/379 |
| 2005/0257064 | A1* | 11/2005 | Boutant et al. | 713/180 |
| 2006/0043182 | A1* | 3/2006 | Kinoshita | 235/449 |
| 2006/0112013 | A1* | 5/2006 | Maloney | 705/45 |
| 2008/0002243 | A1* | 1/2008 | Cowburn | 358/498 |

OTHER PUBLICATIONS

Russell P. Cowburn ("Fingerprinting Documents and Packaging", Jul. 28, 2005, Published by Nature Publishing Group, vol. 436, p. 475).*
Science News Magazine Aug. 20, 2005 vol. 163.

* cited by examiner

*Primary Examiner* — Joseph P. Hirl
*Assistant Examiner* — Chi Nguy
(74) *Attorney, Agent, or Firm* — Steven J. Shapiro; Charles R. Malandra, Jr.

(57) ABSTRACT

A method for providing an indication of authenticity of an electronic image of a document comprises generating a signal corresponding to a profile of at least one of a number of surfaces of the document, converting the signal into a profile signature, and correlating the profile signature with the electronic image of the document. A method for authenticating an electronic image of a document comprises receiving the electronic image of the document and a profile tracing signature of a surface of the document that is associated with the electronic image, and comparing the profile tracing signature with an exemplar profile tracing signature associated with the document. A document processing system comprises a pickup, a signal processing circuit, and a scanning module and is used for producing a profile tracing signature and electronic image of a document and for correlating the profile tracing signature with the electronic image.

15 Claims, 6 Drawing Sheets

SURFACE PROFILE TRACING OF A DOCUMENT

BACKGROUND

The invention disclosed herein relates generally to verification systems, and in particular, to a system and method for authenticating a document or other item from indicia included thereon.

Traditionally, businesses have deposited checks received from, for example, customers by physically taking them to a branch of their bank and depositing them over the counter with a teller or dropping them into a night deposit box. The actual physical presentation of the checks to be deposited was necessary because, under prior banking laws, the depository bank had to present the original of each check to the corresponding paying bank in order to clear the check. This changed in October of 2004 with the enactment of The Check Clearing for the $21^{st}$ Century Act, commonly referred to Check 21. Check 21 removed the legal requirement that an original paper check had to be presented to obtain payment. Instead, digital images can now be used to transport check data, for example, from a customer to the bank of first deposit and/or from the bank of first deposit to the paying bank. If a bank cannot process a check image, the image can be printed, according to certain specifications, to create what is known as a substitute check, which is the legal equivalent of the original paper check. Check 21 has thus opened the door for remote check deposit solutions wherein check images, rather than original paper checks, are used to make deposits, thereby enabling businesses to eliminate trips to the bank. In addition, the use of check images also reduces check transportation costs among banks and improves funds availability.

For obvious reasons, such as to prevent fraud, it is important to be able to authenticate checks at various points in the banking system. Many checks incorporate sophisticated anti-counterfeiting measures such as engraved printing, specialized color patterns, embossed markings, holograms, and embedded security strips. Furthermore, the handwritten signature on a check is another feature that enhances security. Not only is the written pattern of the signature difficult to manually reproduce, but the pressure of the pen against the paper during the process of writing the signature creates a relief pattern (i.e., a depression in the paper). Prior to Check 21, presentation of the original check provided the depository bank and/or the paying bank an opportunity to examine whether the submitted check included one or more of these anti-counterfeiting measures and whether the handwritten signature was original. By examining the original check, the bank was more readily able to detect a forgery, unauthorized alterations (e.g., adding a "0" to increase the amount of a check from $10 dollars to $100 dollars), etc.

Although providing several benefits (e.g., eliminating trips to the bank, reducing check transportation costs, and improving funds availability), the implementation of Check 21 magnifies many security challenges because the original check, in most instances, is not available for examination. More specifically, most if not all of the anti-counterfeiting measures mentioned above are rendered ineffectual when a check is converted to a relatively low resolution digital image. Embossed markings and the relief pattern of the handwritten signature, for example, reproduce very poorly in photographs and/or scanned images because lighting in such systems is typically designed to be diffuse in order to avoid reflections. As a result, embossed markings and the relief pattern of the handwritten signature completely disappear in scanned images unless side lighting is employed. As another example, the pattern of interference which produces a hologram's three-dimensional image is not reproduced in a scanned image. Thus, the usefulness of holograms as an anti-counterfeiting measure is eliminated.

Elimination of the effectiveness of these anti-counterfeiting measures alone causes serious problems for banks. Compounding this problem is the fact that technology has become so advanced that even standard commercial devices, such as photocopiers and printers, are capable of producing credible copies of documents. Accordingly, a thief may utilize these devices to produce counterfeit documents, which when converted to a digital image, may be nearly impossible to detect as being counterfeit.

Thus, there exists a need for a system and method for authenticating a document or other item from indicia included thereon.

SUMMARY

One aspect of the present invention relates to a method for providing an indication of authenticity of an electronic image of a document. The method comprises generating a signal corresponding to a profile of at least one of a number of surfaces of the document, converting the signal into a profile signature, and correlating the profile signature with the electronic image of the document.

Another aspect of the present invention relates to a method for authenticating an electronic image of a document. The method comprises receiving the electronic image of the document and a profile tracing signature of a surface of the document that is associated with the electronic image, and comparing the profile tracing signature with an exemplar profile tracing signature associated with the document.

Another aspect of the present invention relates to a document processing system comprising a pickup structured to sense contour variations on a surface of a document and to generate a signal based on the contour variations in response to relative movement between the pickup and the surface of the document, a signal processing circuit for converting the signal into a profile tracing signature, and a scanning module for generating an electronic image of the document, wherein the profile tracing signature is correlated with the electronic image of the document.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Each printing technology used to create a secured document has a number of distinctive characteristics and/or indicia. For example (and without limitation), some printing technologies decrease the elevation of a portion of the document surface by causing indentations in the document (e.g., writing with a ballpoint pen), some add material to a portion of the document surface and thus raise that portion's elevation relative to a portion of the document surface that does not have printing thereon (e.g., laser printing), some do not alter the elevation of the document surface because the ink used simply soaks into the document (e.g., ink jet printing), and some alter the surface texture of the document (e.g., dye sublimation printers may make the surface waxy). These distinctive characteristics may be utilized to ascertain the authenticity of a document and/or to distinguish a secured document from a counterfeit copy. Furthermore, many secured documents incorporated anti-counterfeiting measures.

As employed herein, the terms "document", "secured document", and variations thereof, refer to an item, for example and without limitation, currency, checks, certificate of deposits, stock certificates, postage, credit cards, etc. which include a distinctive printing characteristic and/or incorporate a number of anti-counterfeiting measures such as engraved printing, specialized color patterns, embossed markings, holograms, and embedded security strips (among others). The expression "a number of" and variations thereof, as employed herein, shall refer broadly to any quantity, including a quantity of one.

Other characteristics and/or indicia may be used to distinguish documents from each other and to ascertain the authenticity of a document. For instance, another helpful indicator of check authenticity is the presence of perforations on the top edge (or left edge) of the check. The presence of perforations indicates that a check was likely removed from a checkbook printed by a security printer, thereby increasing the likelihood that the check is authentic. Thus, the ability to detect perforations on a check would be advantageous for banking systems, as the presence of perforations suggests that the check is authentic; as opposed to a fraudulent check (e.g., made using a copier) which would not have the perforations because the fraudulent check would not have been torn from a checkbook issued by the bank.

Figure 1:
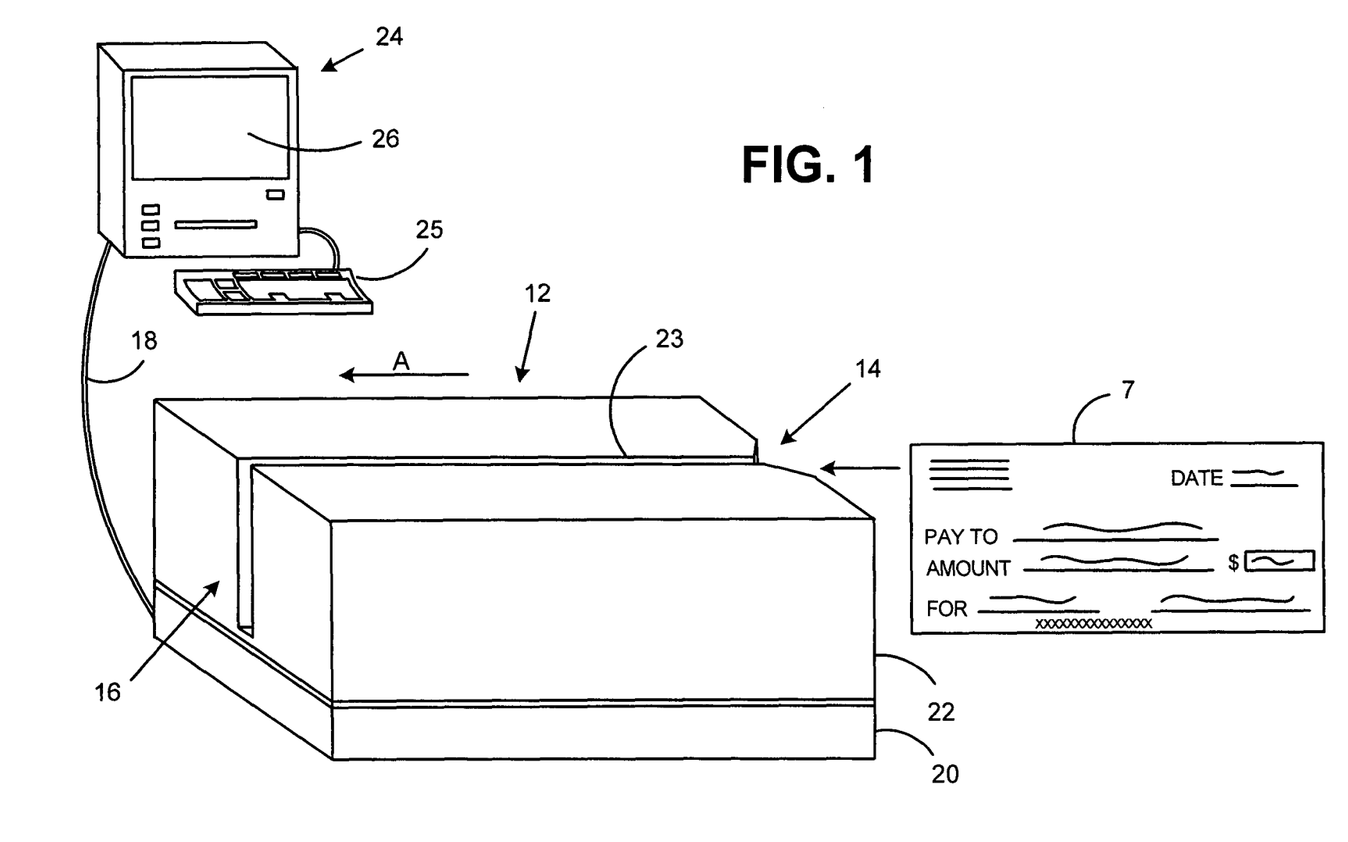
FIG. 1 is an isometric view of a check processing system according to one embodiment of the present invention.
Figure 2:
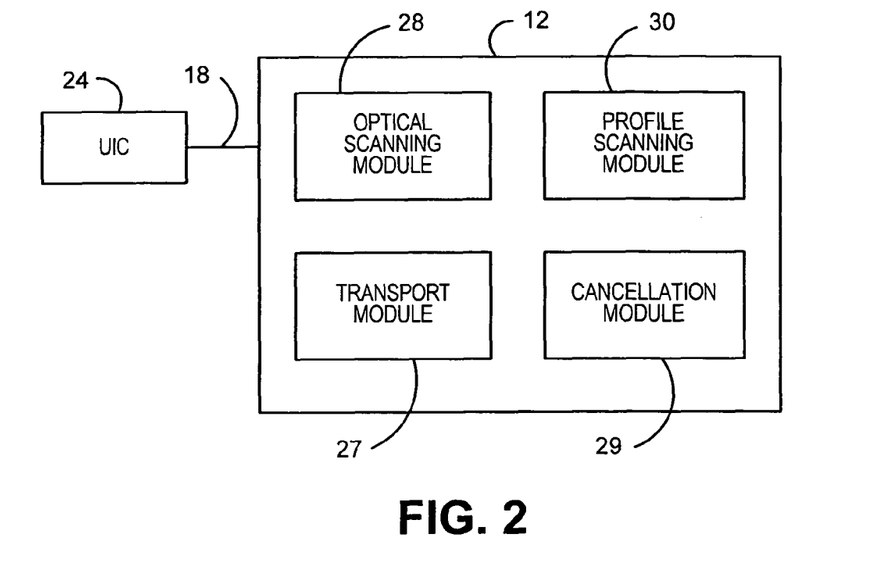
FIG. 2 is a simplified block diagram of the check processing system of FIG. 1.

FIG. 1 and FIG. 2 are an isometric view and a simplified block diagram, respectively, of a check processing system 10 according to the present invention. Check processing system 10 exploits a number of the distinctive printing characteristics and security features discussed above (without limitation) to authenticate checks. Check processing system 10 comprises a housing, designated generally by the reference numeral 12, the housing 12 having a check input end, designated generally by the reference numeral 14, and a check output end, designated generally by the reference numeral 16. The housing 12 includes a base 20 and a cover 22 mounted on the base 20. The cover 22 may be removed to expose various operating components and parts for service and/or repair as needed. The cover 22 includes a slot 23, connecting the check input end 14 to the check output end 16.

The check processing system 10 also includes a user interface controller 24 (UIC) which, in the current embodiment, is remotely connected to the housing 12 via a communications/power bus 18. The UIC 24 may include one or more input/output devices, such as, for example, a keyboard 25 and a display device 26. The UIC 24 may also include a storage device (not shown), such as a disc drive or memory, and a central processing unit (CPU) (not shown) for executing one or more routines contained on the storage device. Keyboard 25 and display device 26 are structured to provide a user interface to the CPU. In one embodiment the UIC 24 is a personal computer (PC).

The base 20 carries a number of modules or sub-systems each of which performs a different task on a check 7. Referring to FIG. 2, in the current embodiment, the check processing system 10 includes a transport module 27, an optical scanning module 28, a profile scanning module 30, and a cancellation module 29, among others.

The transport module 27 conveys the check 7 within slot 23 to each of the other modules, generally in a downstream path of travel as indicated by arrow A (FIG. 1). As the check 7 is conveyed, it passes by and/or is brought into contact with the other modules prior to exiting the check processing system 10 at the check output end 16. More specifically, the check passes by and/or is brought into contact with the optical scanning module 28, the profile scanning module 30, and the cancellation module 29.

The optical scanning module 28 is structured to generate a digitized image of the check 7. More specifically, the optical scanning module 28 is structured to read the text and/or illustrations on the front and/or rear faces of the check 7 and to capture the information as a digitized image that can be stored, displayed, and manipulated as needed by the check processing system 10 and/or other device. In the current embodiment, for example, the digitized image is transmitted to the UIC 24 via the communications/power bus 18 where it is stored, displayed, and used to authenticate the check 7.

The profile scanning module 30, as will be described in more detail below, is structured to generate a signal corresponding to a profile of one or more of a number of surfaces of the check 7. In the current embodiment, the signal is transmitted to the UIC 24 via the communications/power bus 18 where the CPU converts the signal into a profile signature which is correlated with the digitized image of a scanned check. More specifically, in the current embodiment, the profile scanning module 30 is structured to detect a number of indicia on at least one of the front face, the rear face, the top edge, the bottom edge, the leading edge, and/or the trailing edge of the check 7 and to generate a profile tracing signature in response thereto. The indicia that are detected by the profile scanning module may include, without limitation, a written signature, a laser copied signature, an engraved marking, an embossed marking, a thinned area, a hologram material, an applied plastic material, a tear pattern, and a perforation pattern.

The cancellation module 29 is structured to alter the check 7 in such a manner as to indicate that the check 7 has been processed by the check processing system 10. The cancellation module 29 may be structured, for example, to print a cancellation marking on the rear face and/or front face of the check 7, emboss the check 7 with a cancellation making, and/or punch a hole through the check 7 to indicate that the check 7 has been cancelled, among others. The cancellation module 29 helps to insure that the check 7 is not submitted for payment multiple times.

It should be noted that the transport module 27 may be capable effecting bidirectional travel on the check 7 within slot 23. Bidirectional travel may be employed, for instance, in confirming that the cancellation module 29 properly cancelled the check 7. For example, after the cancellation module 29 has embossed the check 7 to indicate cancellation, the transport module 27 may reverse the direction of travel of the check 7 within slot 23 such that the check 7 passes by and/or is brought back into contact with the profile scanning module 30. As a result, the profile scanning module 30 can be used to verify that the check 7 was embossed correctly. As a further example, the cancellation module 29 may print a number of cancellation markings on the check 7. After the cancellation module 29 prints the cancellation markings, the transport module 27 may reverse the direction of travel of the check 7 within the slot 23 such that the check 7 passes by and/or is brought back into contact with the optical scanning module 28. As a result, the optical scanning module 28 can generate a second digitized image of the check 7 (the second image including the cancellation markings). The second digitized image may then be compared, for example within the UIC 24, to the first digitized image to verify that the cancellation markings were correctly applied to the check 7.

By supporting bidirectional travel, the check processing system 10 may prevent a user having less than honorable intentions from attempting to process the same check 7 multiple times. Assume for example that the cancellation module 29 prints cancellation markings on processed checks. A user may cover the check 7 with a clear film (e.g., a Mylar® sheath) prior to inserting the check 7 into the check input end 14 of the check processing system 10. Because the film is clear, the optical scanning module 28 will be able to generate a "normal" digital image of the check 7. However, the cancellation module 29 applies the cancellation markings to the clear film, not to the check 7. As a result, the user can merely remove the clear film and submit the same check 7 for processing multiple times.

Figure 3:
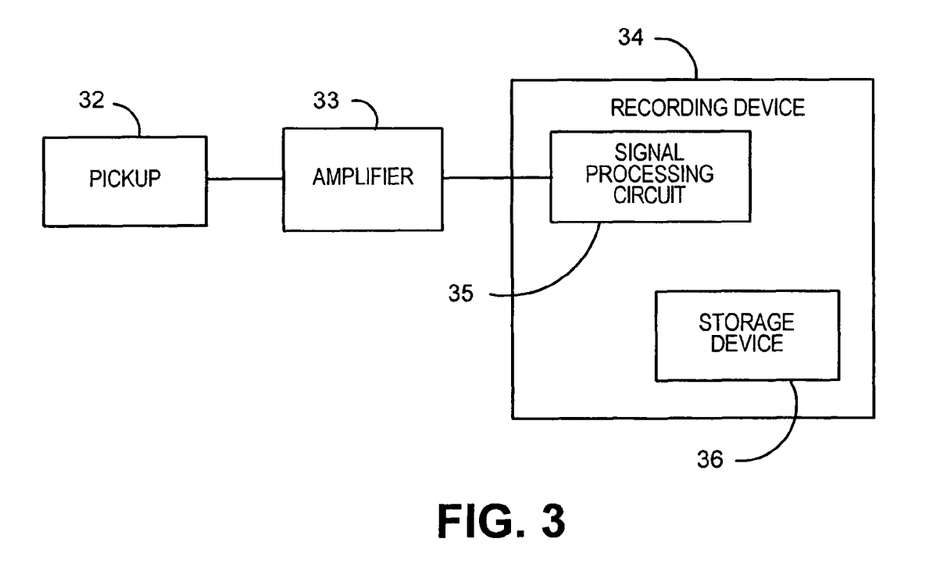
FIG. 3 is block diagram of a profile scanning module according to one embodiment of the present invention.

FIG. 3 is a simplified block diagram of a profile scanning module 30 according to one embodiment. The profile scanning module 30 includes a pickup 32 and a recording device 34. The profile scanning module 30 may also include other components, such as amplifier 33, while remaining within the scope of the present invention.

Generally speaking, the pickup 32 comes into contact with a surface of the check 7 as the check is transported within slot 23 of the check processing system 10. Contour variations on one or more surfaces of the check 7 are sensed by the pickup 32. For example, a pickup 32 may be structured within slot 23 to come into contact with the front face of check 7. Contour variations present on the profile of the front face of check 7 cause the pickup 32 to move. This movement is converted by the pickup 32 into an electrical signal. The pickup 32 may be, for example, a piezoelectric transducer, a modified microphone, or a photograph magnetic cartridge, among others.

In the current embodiment, the signal generated by the pickup 32 is amplified by amplifier 33. The amplified signal is then sent to the recording device 34. The recording device 34 may include a signal processing circuit 35 and a storage device 36 (e.g., disc drive, memory, buffer, etc.), among others. The signal processing circuit 35 may include, for example, an analog-to-digital converter, a digital-to-analog converter, a filter, etc. The signal processing circuit 35 conditions the signal as needed to produce a "profile tracing signature". The profile tracing signature is stored on the storage device 36. The profile tracing signature is also communicated to the UIC 24 which correlates the profile tracing signature with the image of the check 7 produced by the optical scanning module 28. The profile tracing signature may also be used by other components of the check processing system 10 as needed.

It should be apparent that one or more components of the profile scanning module 30 may be incorporated into, or combined with, another component of the check processing system 10 while remaining within the scope of the present invention. For example, the signal processing circuitry 35 and/or the storage device 36 may be incorporated within the UIC 24.

The amount of movement encountered by the pickup 32 can easily be reduced or increased through the use of a lever (not shown). A pickup 32 used to scan the perforations on the top edge of the check 7, for example, may experience a gross (i.e., large) amount of movement. This gross movement may be too large and prevent the use of, for example, a piezoelectric transducer pickup. Likewise a pickup 32 used to scan the front face of the check 7 may experience only fine (i.e., small) amounts of movement. This movement may be too small to be adequately sensed by, for example, a piezoelectric transducer. By using a lever, the amount of movement encountered by each pickup 32 can easily be decreased (scaled down) or increased (scaled up) as needed, thus allowing the same type of pickup 32 (e.g., piezoelectric transducer) to be used in both instances, reducing the complexity of the profile scanning module 30.

Although the profile scanning module 30 has been generally discussed in conjunction with scanning a single surface, it should be apparent that multiple profile scanning modules 30 may be employed, each scanning a different surface and/or a different portion of the same surface of the check 7, while remaining within the scope of the present invention. Additionally, a single profile scanning module 30 having multiple pickups 32 for scanning multiple surfaces and/or a different portion of the same surface of the check 7 is also contemplated.

Figure 4:
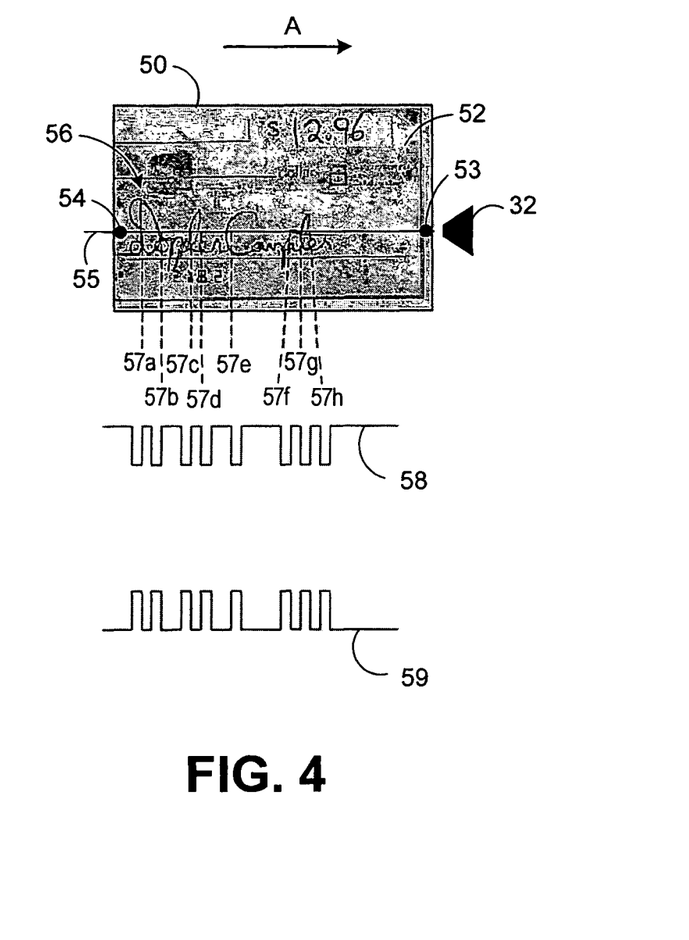
FIG. 4 illustrates an example of the profile scanning module of FIG. 3 in use.

FIG. 4 illustrates the use of the profile scanning module 30. More specifically, a portion of a signed check 50 is shown being scanned by a profile scanning module 30. The pickup 32 of the profile scanning module 30 is positioned against the front face 52 of the check 50 at point 53. As the check 50 is moved (e.g., by the transport module 27) generally in the direction of arrow "A", the pickup 32 travels across the front face of check 50 from point 53 to point 54 along sampling line 55. As shown in FIG. 4, sampling line 55 intersects portions of the handwritten signature 56. The points of intersection with the handwritten signature 56 are marked by lines 57a-57h.

As the pickup 32 travels relative to the check 7, it produces a profile tracing signature associated with the contour of the surface of the front face of the check 7. The profile tracing signature detected by the pickup 32 moving relative to an original check is represented by line 58. For an original document, the handwritten signature 56 causes physical indentations in the front face of the check 7. Thus, at each point where sampling line 55 crosses the signature 56 results in a depression in the profile tracing signature as seen at 58.

In contrast, a forged (e.g., copied) check having a laser printed signature (as compared to the handwritten signature) produces a different profile tracing signature. More specifically, the profile tracing signature detected by pickup 32 moving relative to a copied document is represented by line 59. The pattern of line 59 is inverted (i.e., as compared to line 58) because the laser printer and/or copier used to make the forged check adds material (i.e., toner) to the surface of the document making it higher at the points where the sampling line 59 crosses the copied signature. A check that is encased in a clear film (e.g., a Mylar® sheath as discussed above) will produce a different profile (not shown in FIG. 4). Because it is relatively smooth, the clear film covering the check will produce a substantially flat profile.

In brief, image data obtained by the optical scanning module 28 is correlated with the profile tracing signature (i.e., lines 58/59) across the front face of check 7 obtained by the profile scanning module 30. The nature of the genuine print (i.e., pressing down with a pen) determines the expected pattern (i.e., indentations caused by the handwriting) in the profile tracing signature 58. This expected pattern is difficult to forge using typical copying methods. The profile tracing signature 58 may be compared to an exemplar profile tracing signature. A determination can then be made as to whether the check 7 was original or forged.

Figure 5:
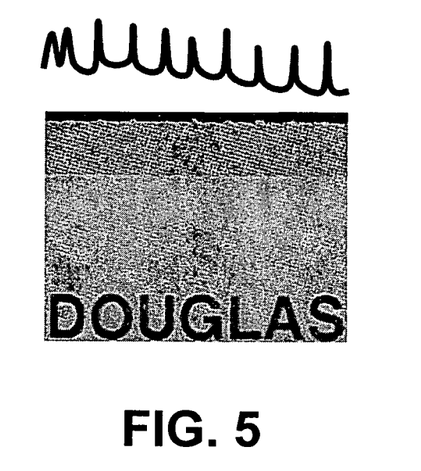
FIG. 5 is a profile tracing signature from the profile scanning module of FIG. 3 for an authentic check having perforations on the top edge thereof.
Figure 6:
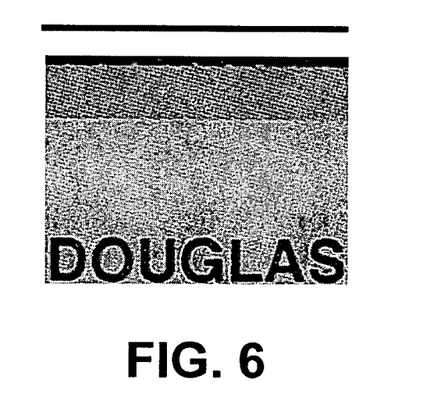
FIG. 6 is a profile tracing signature from the profile scanning module of FIG. 3 for a forged check having a non-perforated top edge thereof.

As employed herein, the expression "an exemplar profile tracing signature" and variations thereof shall refer broadly to a typical or standard profile tracing signature for a particular type of item. FIG. 5 and FIG. 6, for example, illustrate profile tracing signatures for an authentic check having perforations on the top edge thereof and a profile tracing signature for a forged check having a non-perforated (i.e., substantially straight) top edge, respectively. The amplitude of the profile tracing signature (i.e., as seen in FIG. 5) for the authentic check has a certain magnitude signifying the presence of perforations, whereas the amplitude of the profile tracing signature (i.e., as seen in FIG. 6) for the forged check has a certain lower magnitude therein signifying the absence of perforations. By comparing the profile tracing signatures shown in FIGS. 5 and 6 to an exemplar profile tracing signature, it can determined which of the profile tracing signatures was generated from an authentic check and which was generated from a forged check.

Figure 7:
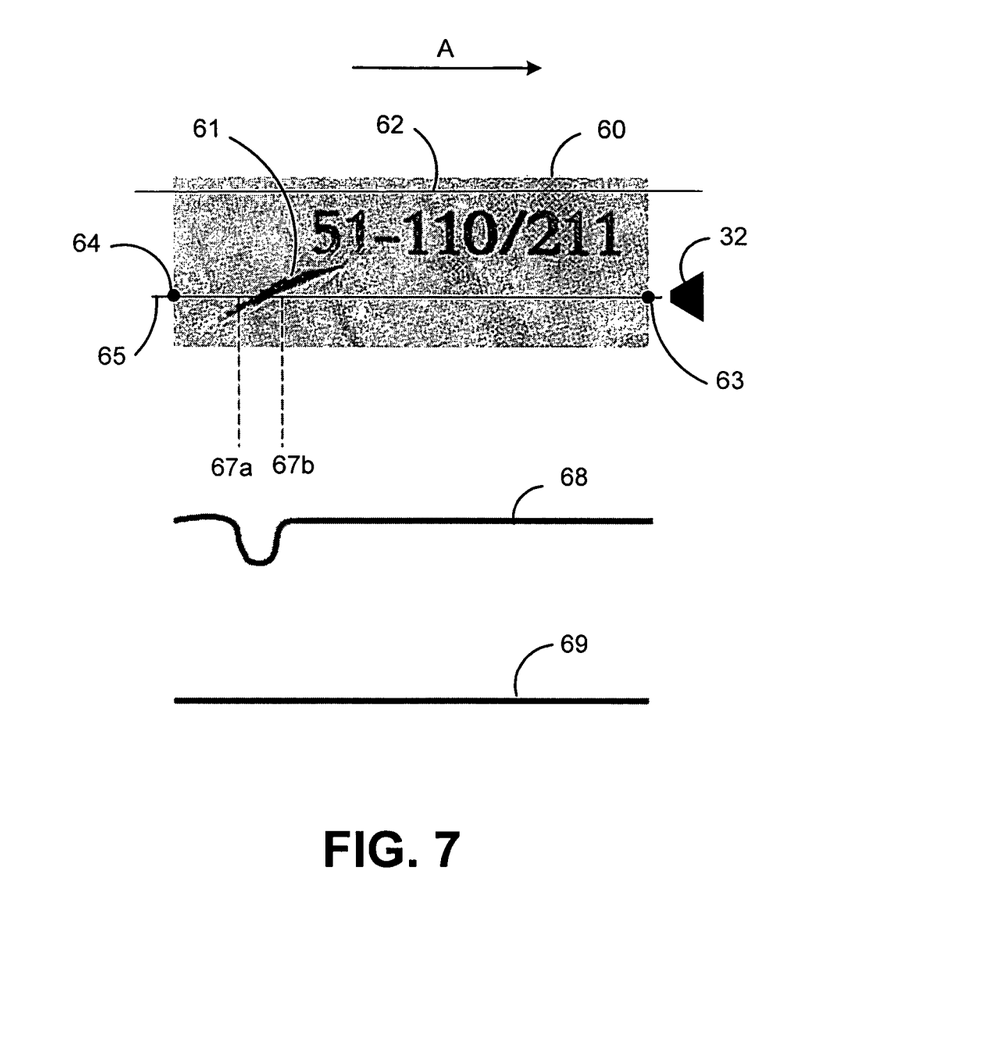
FIG. 7 illustrates an example of the profile scanning module of FIG. 3 in use with a cancelled check.

FIG. 7 illustrates that this same approach, at a gross scale, may be utilized to detect a genuine scrape cancellation on a check or a fraudulent image of such a cancelled check. Here a check 60 includes a portion having a scraped hole 61. The fiber patterns of this scraped hole 61 may be observed, but are difficult to forge. Without the physical check, however, it is not possible to know whether these fiber patterns are an image or the actual fibers torn by the abrasion. This is an issue since the original check will not survive.

A check that is encased in a clear film when submitted (e.g., a Mylar® sheath as discussed above) may be detected with the image and/or the trace profile. On the image, the gouged film layer looks different than torn paper fibers. The trace profile will also be different because of the different properties of paper and plastic. Subsequent forensic analysis will be able to determine if the clear film protector was in place when the cancelled check was re-read (i.e., if the clear film was stored by the customer and the check was resubmitted with the clear film having the ink jet printed cancellation present on top thereof).

More specifically, a portion of a signed check 60 is shown being scanned by a profile scanning module 30. The pickup 32 of the profile scanning module 30 is positioned against the front face 62 of the check 60 at point 63. As the check 60 is moved (e.g., by the transport module 27) generally in the direction of arrow "A", the pickup 32 travels across the front face 62 of check 60 from point 63 to point 64 along sampling line 65.

As shown in FIG. 7, sampling line 65 intersects a portion of the scraped hole 61. The points where the scraped hole 61 starts and ends are marked by lines 67*a*-67*b*. When the profile tracing signature is captured, the scraped hole 61 with sloping walls (i.e., the current example is of an abrasion and not a clean puncture hole) on either side is clearly visible in the profile tracing signature 68. In contrast, the profile tracing signature 69 of a laser image or photograph, regardless of the resolution used, results in a smooth line. It should be noted that the data gathered in conjunction with the discussion of FIG. 7 is at a much lower vertical scale than the data gathered in conjunction with FIG. 4 because the thickness of the document is much greater than the laser print toner thickness. In this instance, therefore, the laser toner is displayed as having no thickness because the profile scanning module 30 is scaled for detection of the entire document thickness being absent in the scraped hole 61 rather than the small variability associated with the embossed or indented text.

Once again, image data obtained by the optical scanning module 28 is correlated with the profile tracing signature (i.e., lines 68/69) obtained by scanning the front face 62 of check 60 with the pickup 32 of the profile scanning module 30. The nature of the genuine print determines the expected pattern in the profile tracing signature which is difficult to forge using typical copying methods. The profile tracing signatures 68 and 69 are compared to an exemplar profile tracing signature. A determination can then be made as to whether the check 60 was original or forged.

Although described and illustrated in the context of a use within a check processing system 10, it should be apparent that the teachings of the present invention may be utilized in any application for which the authentication of an item is desirable while remaining within the scope of the present invention. The teachings of the present invention may be employed, for example and without limitation, to verify the authenticity of currency, CD's, stock certificates, postage, credit cards, etc. which may incorporate anti-counterfeiting measures such as engraved printing, specialized color patterns, embossed markings, holograms, and embedded security strips (among others) to help prevent fraud.

Figure 8:
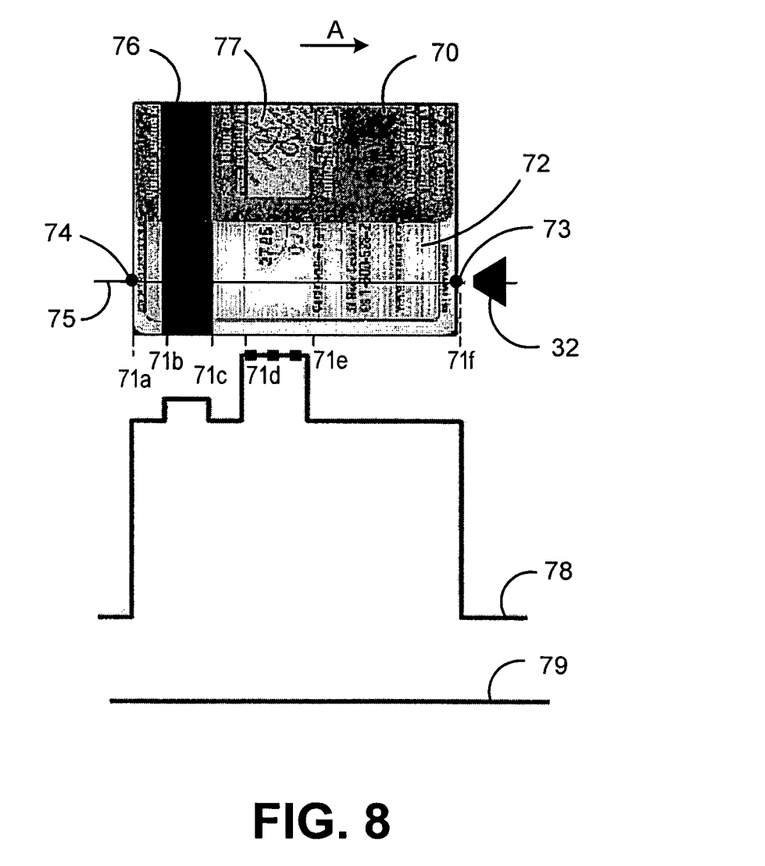
FIG. 8 illustrates an example of the profile scanning module in use with a credit card reader.

FIG. 8, for instance, illustrates the profile scanning module 30 being used in a credit card reader (not shown) to detect the surface features associated with the magnetic strip and the human signature block on the back of a credit card. More specifically, a portion of a credit card 70 is shown being scanned by a profile scanning module 30. The pickup 32 of the profile scanning module 30 is positioned against the back surface 72 of the credit card 70 at point 73. As the credit card 70 is moved (e.g., swiped through the credit card reader) generally in the direction of arrow "A", the pickup 32 travels across the back surface 72 of the credit card 70 from point 73 to point 74 along sampling line 75.

The scanned image again shows a profile tracing signature with specific transition point mapping (i.e., 71*a*-71*f*). The high relief of the original card profile tracing signature trace 78 shows the onset of the edge of the card 70 (i.e., at point 71*f*), the low amplitude rise/fall (i.e., at points 71*e* and 71*d*) associated with the signed text and security printing on the signature block 77 (i.e., at points 71*e* and 71*d*), the rise (i.e., at point 71*c*) and fall (i.e., at point 71*b*) associated with the magnetic strip 76, and the large step off the far end of the card 70 (i.e., at point 71*a*). In contrast, the profile tracing signature 79 of a laser image or photograph of the credit card 70, regardless of the resolution used, results in a smooth line. It should be noted that the data being gathered in conjunction with the discussion of FIG. 8 is at a much lower vertical scale than the data gathered in conjunction with FIG. 4. In this instance, therefore, the laser toner is displayed as having no thickness because the profile scanning module 30 is scaled for detection of the relatively large relief changes rather than the small variability associated with, for example, embossed or indented text.

Again the nature of the real credit card 70 determines the expected pattern in the profile tracing signature which is difficult to forge using typical copying methods. The profile tracing signatures (i.e., lines 78/79) obtained by scanning the back surface 72 of credit card 70 with the pickup 32 of the profile scanning module 30 can be compared with an exemplar profile tracing signature. A determination can then be made as to whether the credit card 70 is original or forged.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for providing an indication of authenticity of an electronic image of a physical document comprising:
   generating a signal corresponding to contour variations of at least one of a number of surfaces of said document;
   converting said signal into a profile tracing signature; and
   correlating said profile tracing signature with said electronic image of said document to ascertain authenticity of said physical document;
   wherein said generating a signal includes tracing said at least one of a number of surfaces of said physical document with a pickup; and responsive to said tracing, detecting one or more characteristics on said at least one of a number of surfaces of said physical document, and wherein said signal includes an indication of each of said one or more detected characteristics.

2. The method of claim 1 wherein said detecting one or more characteristics on said at least one of a number of surfaces of said physical document includes detecting at least one of a written signature, a laser copied signature, an engraved marking, an embossed marking, a thinned area, a hologram material, an applied plastic material, a tear pattern, a perforation pattern.

3. A document processing system comprising:
   a pickup structured to sense contour variations on a surface of a physical document and to generate a signal based on said contour variations in response to relative movement between said pickup and said surface of said document;
   a signal processing circuit for converting said signal into a profile tracing signature; and
   a scanning module for generating an electronic image of said document;
   wherein said profile tracing signature is correlated with said electronic image of said document to ascertain authenticity of said physical document by comparing said profile tracing signature with an exemplar profile tracing signature associated with said physical document.

4. The document processing system of claim 3 further comprising an amplifier electrically connected between said pickup and said signal processing circuit, said amplifier structured to amplify said signal.

5. The document processing system of claim 3 further comprising a lever structured to alter a sensitivity of said pickup.

6. The document processing system of claim 3 wherein said pickup is selected from the group consisting of a piezoelectric transducer, a microphone, and a photograph magnetic cartridge.

7. The document processing system of claim 3 wherein said document is selected from the group consisting of an item of currency, a check, a certificate of deposit, a stock certificate, an item of postage, and a credit card.

8. The document processing system of claim 3 further comprising a transport module structured to transport said physical document through at least a portion of said document processing system.

9. The document processing system of claim 3 further comprising a cancellation module structured to indicated that said physical document has been processed.

10. The document processing system of claim 3 further comprising a user interface controller, said user interface controller structured to receive said profile tracing signature and said electronic image of said physical document and to correlate said profile tracing signature with said electronic image of said document.

11. The document processing system according to claim 10, wherein said user interface controller includes a central processing unit and a storage device.

12. The document processing system according to claim 11, wherein said user interface controller is a PC.

13. The system claimed in claim 3, wherein said exemplar tracing signature is standard for a particular type of said physical document.

14. The system claimed in claim 3, wherein the contour variation are perforations on at least one edge of said document.

15. The system claimed in claim 3, wherein the contour variations are elevations in a surface of said physical document created by deposition of inks on said surface.

* * * * *